United States Patent [19]
McGrew, Jr.

[11] Patent Number: 5,885,446
[45] Date of Patent: Mar. 23, 1999

[54] WASTEWATER TREATMENT SYSTEM FOR LOADING TABLETS INTO WASTEWATER CONDUIT

[76] Inventor: Henry E. McGrew, Jr., 8365 Arapaho Dr., Shreveport, La. 71107

[21] Appl. No.: 833,919

[22] Filed: Apr. 10, 1997

[51] Int. Cl.$^6$ .............................. B01D 17/12; B01D 11/02
[52] U.S. Cl. ........................ 210/91; 210/94; 210/198.1; 422/119; 422/264; 422/266; 422/276
[58] Field of Search .................................. 210/85, 94, 95, 210/169, 198.1, 199, 754, 764, 91; 422/119, 264, 264 B, 265, 266, 274, 277, 278; 137/268; 239/34, 35, 310

[56] References Cited

U.S. PATENT DOCUMENTS

| | | | |
|---|---|---|---|
| 3,474,817 | 10/1969 | Bates et al. | 210/169 |
| 3,595,786 | 7/1971 | Hervath et al. | 422/264 B |
| 4,016,079 | 4/1977 | Severin | 210/169 |
| 4,555,347 | 11/1985 | O'Dowd et al. | 210/95 |
| 4,584,106 | 4/1986 | Held | 137/268 |
| 4,917,868 | 4/1990 | Alexander et al. | 422/264 |
| 5,089,127 | 2/1992 | Junker et al. | 422/264 |
| 5,350,512 | 9/1994 | Tang | 422/264 |
| 5,597,477 | 1/1997 | Harry | 210/86 |

*Primary Examiner*—Joseph W. Drodge
*Attorney, Agent, or Firm*—John M Harrison

[57] ABSTRACT

A wastewater treatment system for treating wastewater effluent flowing through a sewer pipe from a sewage treatment plant, and specially designed chlorine tablets for use in the treatment system. In a preferred embodiment the wastewater treatment system is characterized by a wastewater flow conduit which is mounted in the sewer pipe and a tablet loading neck, closed by a removable lid, extends upwardly from the wastewater flow conduit. A tablet support rod extends downwardly through the lid and tablet loading neck into the wastewater flow conduit. Multiple treatment tablets, each having a central opening, are slidably mounted on the tablet support rod in stacked relationship, and as the tablets in the wastewater flow conduit are dissolved by the flowing wastewater, the tablets in the tablet loading neck descend on the tablet support rod into the conduit, to replace the dissolved tablets. In another embodiment the tablet support rod is slidably mounted in the lid and biased upwardly and as the tablets are dissolved, the tablet support rod moves upwardly through the lid and is either visually inspected or attached to an alarm switch which activates an alarm to indicate the need for replacing tablets on the rod.

19 Claims, 3 Drawing Sheets

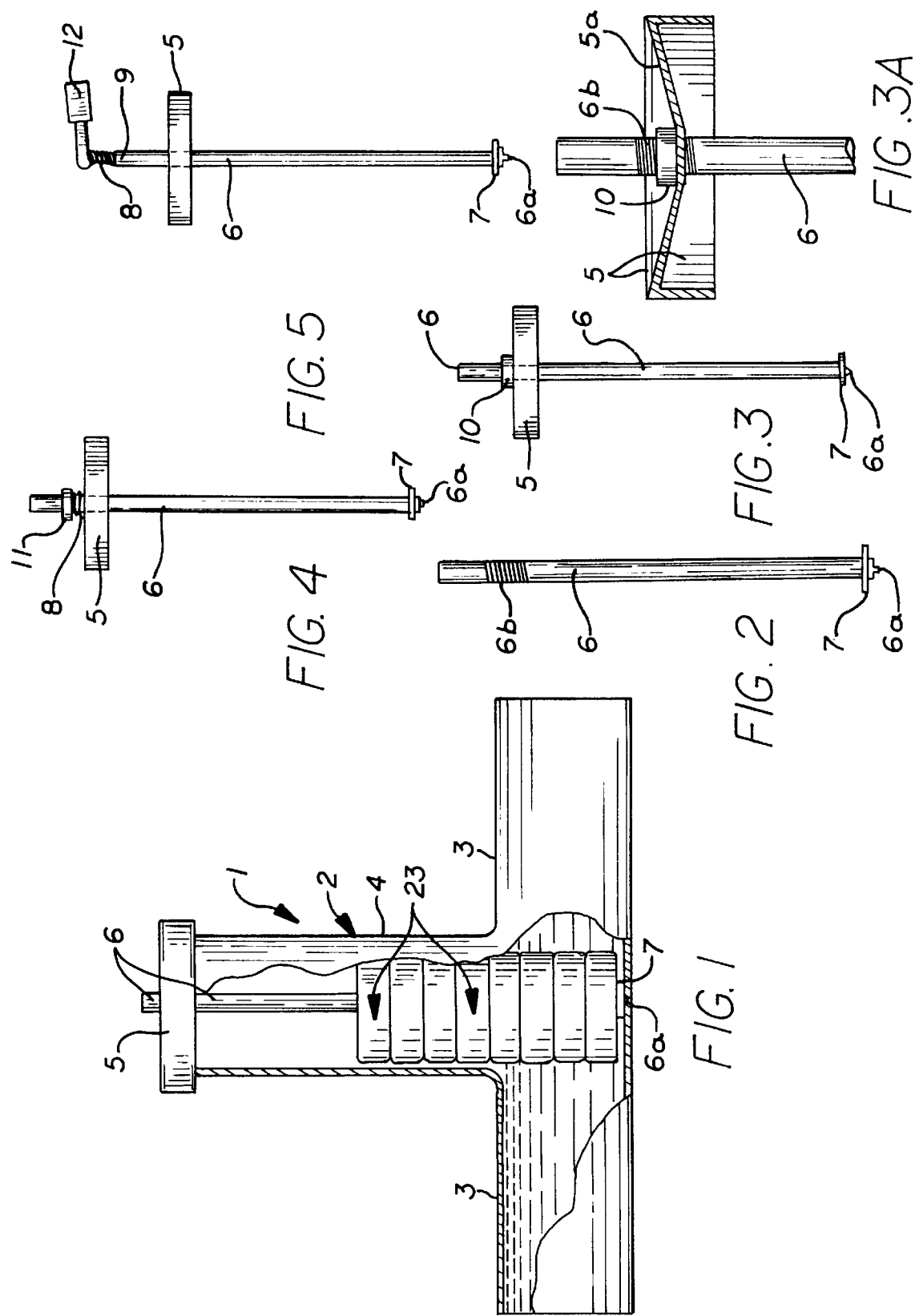

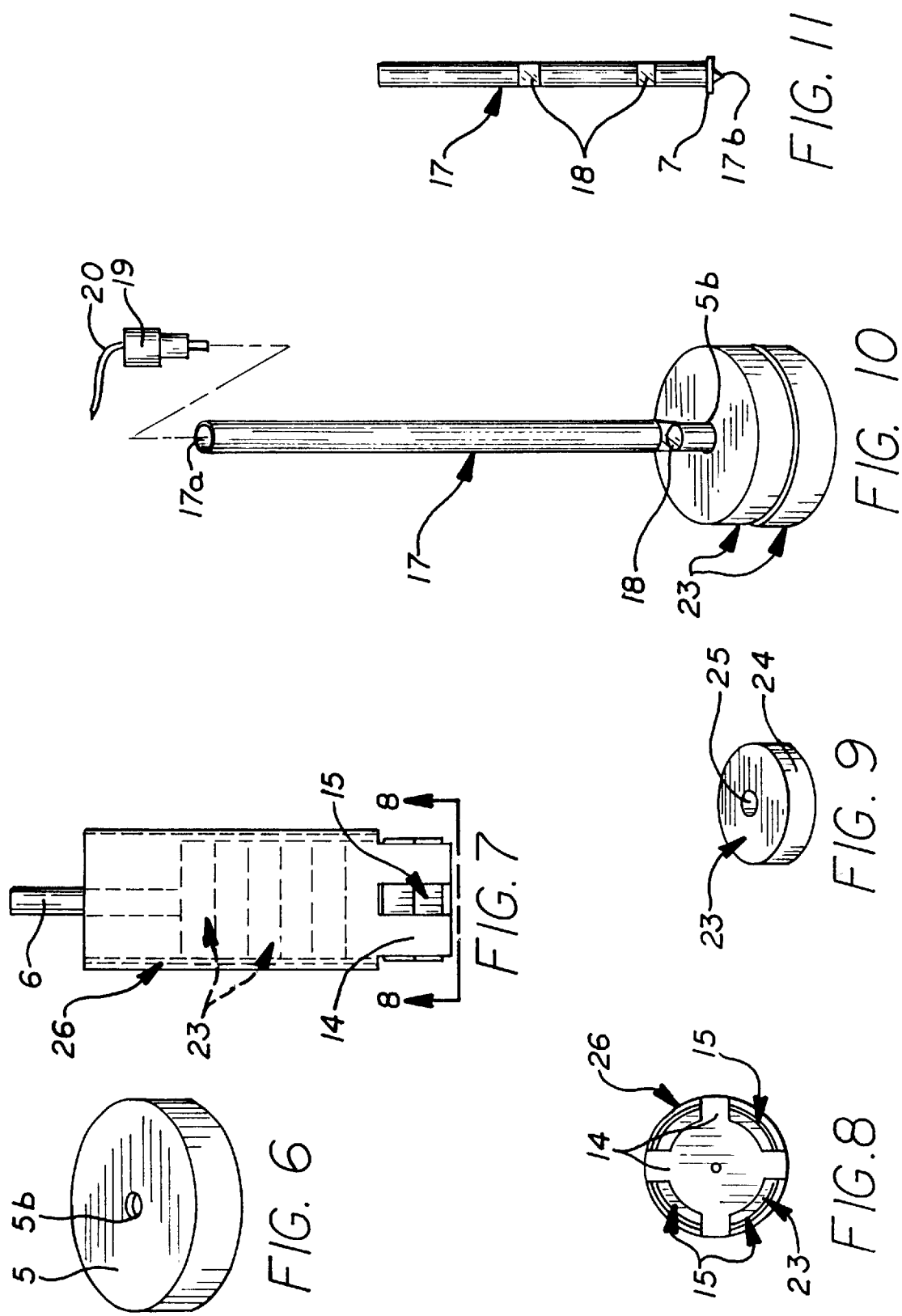

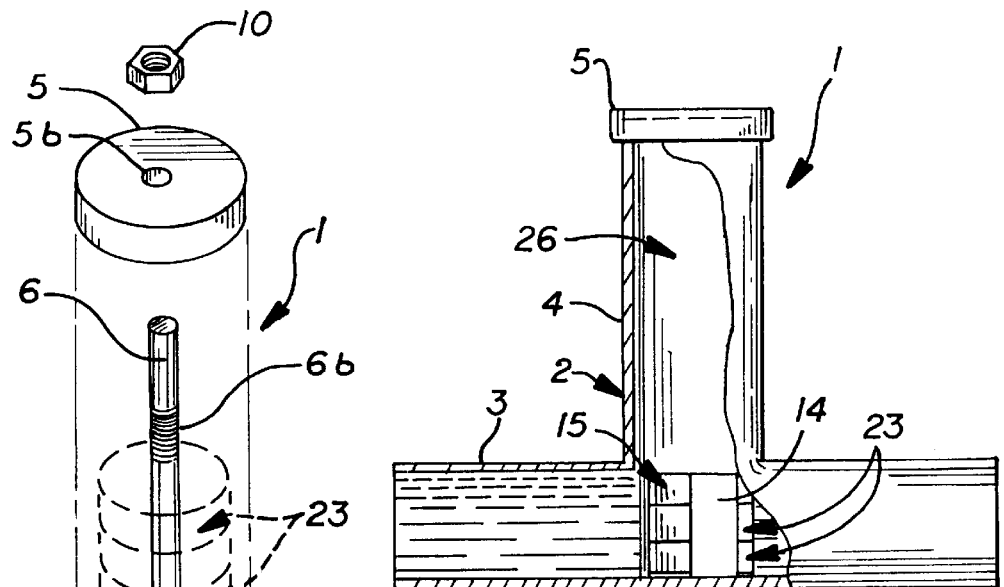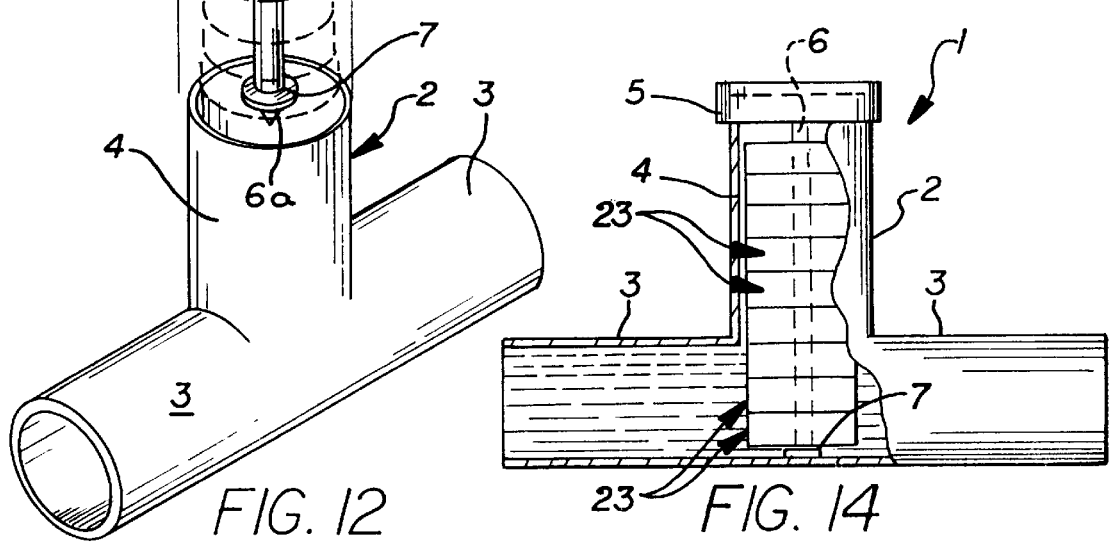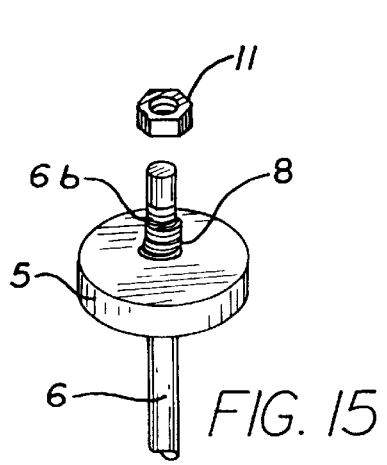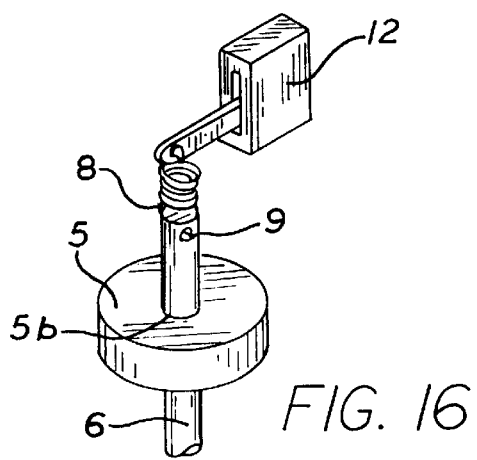

WASTEWATER TREATMENT SYSTEM FOR LOADING TABLETS INTO WASTEWATER CONDUIT

BACKGROUND OF THE INVENTION

Field of the Invention

This invention relates to apparatus for treating wastewater in a sewage treatment system and more particularly, to a wastewater treatment system for treating wastewater effluent flowing from a wastewater treatment plant through a wastewater or sewer line and specially designed chlorine treatment tablets for use with the wastewater treatment system. In a preferred embodiment the wastewater treatment system includes an elongated wastewater flow conduit which is inserted lengthwise in the wastewater or sewer line or pipe and a cylindrical tablet loading neck fitted with a removable lid and, optionally, with a tablet loading sleeve, extends upwardly in perpendicular relationship from the wastewater flow conduit. A tablet support rod extends through the lid and tablet loading neck or tablet loading sleeve and the flanged end of the rod terminates in the wastewater flow conduit. Multiple chlorine treatment tablets, each fitted with a central rod opening, are slidably mounted on the tablet support rod in stacked relationship in the wastewater flow conduit and tablet loading neck or sleeve. As the treatment tablets contained in the wastewater flow conduit are dissolved by the flowing wastewater, the tablets located in the tablet loading neck or sleeve descend by gravity on the tablet support rod into the conduit to replace the dissolved tablets. In another embodiment the tablet support rod is slidably mounted in the lid and a coil spring interposed between the lid and a nut threaded on the tablet support rod above the lid, biases the tablet support rod upwardly through the lid. When it is loaded with treatment tablets, the tablet support rod is weighted downwardly against the bias of the spring and as the treatment tablets are dissolved by the flowing wastewater in the wastewater flow conduit, the tablet support rod slides upwardly through the lid and the upwardly-displaced rod visually indicates the need for reloading the rod with tablets. In another embodiment an alarm switch element of an alarm system is attached to the upper end of the tablet support rod and upward displacement of the rod through the lid activates the alarm switch and alarm to indicate the need for reloading the treatment system with tablets. In still another embodiment the tablet support rod is biased upwardly by a deformable membrane which spans the lid and engages a nut threaded on the rod. In yet another embodiment, a tablet support tube extends downwardly through the lid and tablet loading neck and terminates in the wastewater flow conduit. A photoelectric sensor wired to an audible or visual alarm is inserted in the upper end of the tablet support tube, and that portion of the tube extending into the wastewater flow conduit is fitted with a transparent window. The stacked treatment tablets slidably mounted on the tablet support tube in the wastewater flow conduit initially cover the transparent window, and as they are dissolved in the flowing wastewater, the transparent window is uncovered, allowing light to enter the tablet support tube and activate the photoelectric sensor and alarm, thereby indicating the need for replacing treatment tablets in the treatment system. In still another embodiment a transparent window is also provided in that portion of the tablet support tube which extends through the tablet loading neck and the photoelectric sensor and alarm are activated as the tablets initially covering that part of the tube descend into the wastewater flow conduit to replace the dissolved tablets, thereby indicating the need for reloading tablets in the tablet loading neck.

Conventional sewage treatment systems include a primary treatment tank or plant which is designed to treat raw sewage flowing into the treatment plant from a structure such as a home or business. Effluent from the treatment plant is directed through a horizontal wastewater or sewer pipe into a vertical treatment riser, the upper end of which is closed by a removable lid and the bottom end of the treatment riser terminates in a holding tank for the effluent. Round chlorine tablets are typically dropped in the treatment riser to facilitate further treatment of effluent entering the treatment riser from the sewer pipe. One of the problems inherent in this method of loading the treatment riser, is that the treatment tablets frequently enter the treatment riser in tilted configuration, and this sometimes causes the treatment tablets to become lodged or jammed in the treatment riser, often causing backflow of effluent through the sewer pipe.

Accordingly, it is an object of this invention to provide a new and improved wastewater treatment system and specially designed, perforated chlorine tablets for treating wastewater effluent flowing from a primary treatment plant.

Another object of this invention is to provide a wastewater treatment system characterized by a wastewater flow conduit which is inserted along the length or run of a wastewater or sewer pipe distributing wastewater effluent from a primary sewage treatment plant, a tablet loading neck extending upwardly from the wastewater flow conduit and a tablet support rod which extends downwardly through the tablet loading neck into the wastewater flow conduit, and upon which is slidably mounted multiple, perforated chlorine tablets in stacked relationship, wherein the chlorine tablets mounted on that portion of the tablet support rod extending into the wastewater flow conduit are dissolved by the flowing wastewater effluent and the treatment tablets contained in the tablet loading neck descend on the tablet support rod to replace the dissolved tablets.

Still another object of this invention is to provide a wastewater treatment system characterized by a wastewater flow conduit which is mounted in a wastewater or sewer pipe and a tablet loading neck optionally provided with a tablet loading sleeve, extending upwardly perpendicular relationship from the wastewater flow conduit. The tablet support rod is slidably extended through a lid provided on the upper end of the tablet loading neck and multiple treatment tablets are slidably mounted on the tablet support rod in stacked relationship in the wastewater flow conduit and tablet loading neck or sleeve. When loaded with treatment tablets, the upwardly-biased tablet support rod is weighted downwardly and as the treatment tablets contained in the wastewater flow conduit are dissolved, the treatment tablets contained in the tablet loading neck or sleeve descend by gravity on the tablet support rod and replace the dissolved tablets, and the tablet support rod moves upwardly through the lid and is either visually inspected or activates an alarm switch attached to the upper end of the rod to indicate the need for refilling the treatment system with tablets.

A still further object of this invention is to provide a wastewater treatment system characterized by a wastewater flow conduit which is installed in a wastewater effluent sewer pipe, a tablet loading neck extending upwardly from the wastewater flow conduit and a tablet support tube extending through the tablet loading neck and terminating in the waste water flow conduit. A photoelectric sensor is inserted in the upper end of the tablet support tube and a transparent window is provided in that portion of the tablet support tube which extends into the wastewater flow conduit. Multiple chlorine treatment tablets slidably mounted on the tablet support tube in stacked relationship, initially cover the transparent window and as the chemical treatment tablets are dissolved in the flowing effluent, the transparent window is uncovered, such that light enters the tablet support tube and activates the photoelectric sensor and alarm to indicate the need for refilling the treatment system with chlorine tablets.

SUMMARY OF THE INVENTION

These and other objects of the invention are provided in a wastewater treatment system and chlorine tablet for treating wastewater effluent flowing through a wastewater or sewer pipe from a primary sewage treatment plant. In a first embodiment the wastewater treatment system is characterized by a wastewater flow conduit which is inserted in the run of the sewage pipe and a cylindrical tablet loading neck, optionally fitted with a sleeve and closed by a removable lid, extends upwardly in confluent relationship from the wastewater flow conduit. Alternatively, the tablet loading neck can be welded into a saddle-shaped opening cut in the wastewater or sewer pipe to eliminate the wastewater flow conduit. A tablet support rod, terminated on the lower end by a tablet support flange, extends downwardly through the lid and tablet loading neck or sleeve and terminates in the wastewater flow conduit and multiple, perforated chlorine tablets are slidably mounted on the tablet support rod in stacked relationship in the wastewater flow conduit and tablet loading neck or sleeve. As the treatment tablets in the wastewater flow conduit are dissolved, the treatment tablets contained in the tablet loading neck or sleeve drop by operation of gravity on the tablet support rod to replace the dissolved tablets. In another embodiment the tablet support rod is slidably mounted in the lid and biased upwardly by means of a coil spring or deformable membrane spanning the lid. The tablet-loaded support rod is initially weighted downwardly by the tablets and as the tablets are dissolved in the wastewater flow conduit, the tablet support rod is raised through the lid and either visually inspected or attached to an alarm switch and alarm, which indicates the need to reload the tablet support tube with chlorine tablets. In still another embodiment a tablet support tube extends downwardly through the tablet loading neck or sleeve and terminates in the wastewater flow conduit. A photoelectric sensor electrically connected to an alarm is inserted in the upper end of the tablet support tube and a transparent window or windows are provided in that portion of the tube located in the wastewater flow conduit and/or in the tablet loading neck or sleeve. The chlorine tablets in the wastewater flow conduit initially cover the transparent window(s) and after they are dissolved, the transparent window or windows are uncovered, such that light enters the transparent window(s) and the photoelectric sensor and alarm are activated, thereby signaling the need for reloading the treatment system with chlorine tablets.

BRIEF DESCRIPTION OF THE DRAWINGS

The invention will be better understood by reference to the accompanying drawings, wherein:

FIG. 1 is a front view, partially in section, of a preferred embodiment of the wastewater treatment system of this invention;

FIG. 2 is a front view of a threaded tablet support rod element of the wastewater treatment system;

FIG. 3 is a front view of a tablet support rod extending through the lid element of the treatment system;

FIG. 3A is an enlarged, sectional view of the threaded tablet support rod and lid elements of still another embodiment of the treatment system;

FIG. 4 is a front view of the tablet support rod and lid of still another embodiment of the treatment system;

FIG. 5 is a front view of the lid and tablet support rod elements of yet another embodiment of the wastewater treatment system, with the tablet support rod attached to the alarm switch of an alarm;

FIG. 6 is a perspective view of a lid element of the wastewater treatment system;

FIG. 7 is a front view of a tablet loading column element of yet another embodiment of the wastewater treatment system;

FIG. 8 is a bottom view of the tablet loading column illustrated in FIG. 7;

FIG. 9 is a perspective view of a perforated chlorine tablet for use with the wastewater treatment system of this invention;

FIG. 10 is an exploded, perspective view of the tablet support tube and photoelectric sensor components of another embodiment of the wastewater treatment system;

FIG. 11 is a front view of the tablet support tube element of an alternative embodiment of the treatment system illustrated in FIG. 10;

FIG. 12 is an exploded, perspective view of the wastewater treatment system illustrated in FIG. 1, more particularly illustrating a preferred technique for loading the treatment system with chlorine tablets;

FIG. 13 is a front view, partially in section, of the wastewater treatment system with the tablet loading column inserted in the treatment system, wherein a tablet loading column is used;

FIG. 14 is a front view, partially in section, of the wastewater treatment system illustrated in FIG. 12;

FIG. 15 is a perspective view of the lid and tablet support rod elements, with spring and nut components for biasing the support rod upwardly; and FIG. 16 is a perspective view of the lid and tablet support rod illustrated in FIG. 16, fitted with a spring and alarm switch combination.

DESCRIPTION OF THE PREFERRED EMBODIMENTS

Referring initially to FIGS. 1–3, 6–9 and 12–14 of the drawings, in a first embodiment the wastewater treatment system of this invention is generally illustrated by reference numeral 1. The wastewater treatment system 1 is characterized by a treatment system 2, preferably including an elongated, tubular wastewater flow conduit 3, which is inserted longitudinally in a wastewater or sewer pipe (not illustrated), that distributes wastewater effluent from a primary sewage treatment plant (not illustrated) to a holding tank (not illustrated). A cylindrical tablet loading neck 4 extends upwardly from confluent attachment to the wastewater flow conduit 3, as illustrated in FIGS. 1 and 12–14. A neck lid 5, provided with a central rod opening 5b, as illustrated in FIG. 6, is removably fitted on the open upper end of the tablet loading neck 4 and as illustrated in FIGS. 2 and 3, a tablet support rod 6, preferably terminated on the lower end thereof by a tablet support flange 7 and fitted with multiple rod threads 6b adjacent to the upper end thereof, extends downwardly through the rod opening 5b of the lid 5, through the tablet loading neck 4 and terminates in the wastewater flow conduit 3, where the rod tip 6a of the tablet support rod 6 rests on the bottom of the wastewater flow conduit 3.

As illustrated in FIG. 9, a specially designed chemical treatment tablet 23 is characterized by a cylindrical tablet body 24, typically constructed from chlorine, and a tablet perforation or opening 25 extends centrally through the tablet body 24 for receiving the tablet support rod 6, as illustrated in FIG. 12 and hereinafter further described. Multiple treatment tablets 23 are slidably mounted on the tablet support rod 6 in stacked relationship and the bottom-most treatment tablets 23 on the tablet support rod 6 are contained in the wastewater flow conduit 3, while the remainder of the treatment tablets 23 are contained in the tablet loading neck 4 of the treatment system 2. In a typical application, wastewater effluent flowing through a wastewater or sewer pipe (not illustrated) and into the wastewater flow conduit 3 flows around, into contact with and dissolves the treatment tablets 23 contained in the wastewater flow conduit 3, thereby purifying the wastewater effluent as it re-enters the sewer pipe attached to the wastewater flow conduit 3. After the treatment tablets 23 have been dissolved in the wastewater flow conduit 3, the treatment tablets 23 contained in the tablet loading neck 4 descend by gravity on the tablet support rod 6 into the wastewater flow conduit 3, to replace the dissolved treatment tablets 23. After the remaining treatment tablets 23 have been dissolved in the wastewater, the lid retainer nut 10 is unthreaded from the rod threads 6b of the tablet support rod 6, the neck lid 5 is removed from the tablet loading neck 4 and the tablet support rod 6 is then removed from the treatment system 2 and replacement treatment tablets inserted on the tablet support rod 6.

As illustrated in FIG. 7, a cylindrical tablet loading sleeve 26 may be used to receive and contain the loaded tablet support rod 6 and treatment tablets 23, and the tablet loading sleeve 26 is then inserted in the tablet loading neck 4 of the treatment system 2, as illustrated in FIG. 13. Multiple water flow openings 15, separated by flow dividers 14, are formed in the bottom end of the tablet loading sleeve 26, which rests in the wastewater flow conduit 3. It will be appreciated that the flow dividers 14, in combination with the tablet support rod 6, further stabilize the treatment tablets 23 as the wastewater flows through the water flow openings 15.

Referring now to FIGS. 3A–5, 15 and 16 of the drawings, in another embodiment of the invention the tablet support rod 6 is slidably mounted in the rod opening 5b of the neck lid 5 and a spring retainer nut 11 is threaded on the rod threads 6b above the neck lid 5, as illustrated in FIG. 15. A coil spring 8 is interposed by means of a spring pin 9 (FIG. 16) between the spring retainer nut 11 and neck lid 5, and this biases the support rod 6 upwardly through the rod opening 5b when the neck lid 5 is fitted on the tablet loading neck 4. When the treatment tablets 23 are loaded on the tablet support rod 6 in the tablet loading neck 4 and wastewater flow conduit 3, the tablet support rod 6 is forced downwardly due to the weight of the tablets 23, thereby compressing the spring 8 against the spring retaining nut 11. As the treatment tablets 23 contained in the wastewater flow conduit 3 are dissolved by the flowing wastewater, the weight exerted by the treatment tablets 23 is decreased, such that the tablet support rod 6 gradually rises through the rod opening 5b of the neck lid 5. The need for replacing the treatment tablets 23 on the tablet support rod 6 is therefore indicated by the degree of extension of the tablet support rod 6 from the neck lid 5 when the tablet support rod 6 is loaded with treatment tablets 23, when compared to the degree of extension of the tablet support rod 6 from the neck lid 5 when the tablet support rod 6 is devoid of treatment tablets 23.

As illustrated in FIG. 3A, in an alternative embodiment, a deformable membrane 5a having a "memory", spans the interior of the neck lid 5 and engages the bottom end of a lid retainer nut 10, threaded on the rod threads 6b. The deformable membrane 5a normally biases the tablet support rod 6 upwardly through the neck lid 5 and the weight of the loaded treatment tablets 23 pulls downwardly on the tablet support rod 6 and flexes the deformable membrane 5a downwardly, as illustrated in FIG. 3A. As the treatment tablets 23 in the wastewater flow conduit 3 are dissolved by the flowing wastewater the upwardly-biased deformable membrane 5a pushes the tablet support rod 6 upwardly through the neck lid 5 and the need for replacing the treatment tablets 23 on the tablet support rod 6 is indicated by the degree of extension of the upper end of the tablet support rod 6 through the neck lid 5.

In still another embodiment illustrated in FIGS. 5 and 16 of the drawings, a coil spring 8 is attached to the upper end of the tablet support rod 6 by means of a spring pin 9, and an alarm switch 12, attached to an audible or visual alarm (not illustrated) is attached to the upper end of the spring 8. When the tablet support rod 6 is loaded with treatment tablets 23, the spring 8 maintains the upwardly-biased alarm switch 12 in the lower, "off" position illustrated in FIG. 5. As the treatment tablets 23 on the tablet support rod 6 are dissolved by the flowing wastewater in the wastewater flow conduit 3, the alarm switch 12 moves upwardly on the spring 8 due to the reduced spring tension and when the tablet support rod 6 reaches a preset uppermost position, the alarm is activated and indicates the need for replacing the treatment tablets 23 on the tablet support rod 6.

Referring next to FIGS. 10 and 11 of the drawings, in still another embodiment of the invention a tablet support tube 17, having a tube bore 17a, extends downwardly through the rod opening 5b of the neck lid 5 and through the tablet loading neck 4, with the tube tip 17b resting in the wastewater flow conduit 3, as described above with respect to the first embodiment illustrated in FIG. 1. As illustrated in FIG. 10, a transparent window 18, which communicates with the tube bore 17a, is included in that portion of the tablet support tube 17 which is contained in the wastewater flow conduit 3. A photoelectric sensor 19, attached to an audible and/or visual alarm (not illustrated), typically by means of wiring 20, is inserted in the upper end of the tablet support tube 17. As the treatment tablets 23 are slidably mounted in stacked relationship on the tablet support tube 17, the treatment tablets 23 cover the transparent window 18 and therefore block transmission of light through the transparent window 18 and into the tube bore 17a. As the treatment tablets 23 in the wastewater flow conduit 3 are dissolved by the flowing wastewater and the supply of treatment tablets 23 on the tablet support tube 17 is depleted, the transparent window 18 is uncovered. This facilitates transmission of light through the transparent window 18 and into the tube bore 17a, thereby activating the photoelectric sensor 19 and alarm, which indicates the need for replacing the treatment tablets 23 on the tablet support tube 17. Alternatively, as illustrated in FIG. 11, a transparent window 18 may also be included in that portion of the tablet support tube 17 which is contained in the tablet loading neck 4. As the treatment tablets 23 contained in the tablet loading neck 4 descend on the tablet support tube 17 to replace the dissolved treatment tablets 23 in the wastewater flow conduit 3, light enters the upper transparent window 18 and activates the photoelectric sensor 19 and alarm, thereby indicating the need for replacing the treatment tablets 23 on the tablet support tube 17 before the supply of treatment tablets 23 in the wastewater flow conduit 3 is depleted.

It will be appreciated by those skilled in the art that the wastewater treatment system and specially designed perforated tablet of this invention may be implemented in various configurations into a wastewater or sewage treatment system. For example, as described above, the tablet loading neck 4, with or without the tablet loading sleeve 26, can be welded or otherwise installed directly into an opening or "saddle" cut or formed in the sewer or wastewater pipe itself, thus eliminating the wastewater flow conduit 3 element. Furthermore, various types of microswitches and limit switches of various design can be utilized to sense the upward movement of the tablet support rod 6, and these sensing devices may be attached to visual, audible, or both visual and audible alarms of any suitable design, according to the knowledge of those skilled in the art, to fulfill the objectives of the invention.

Accordingly, while the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A wastewater treatment system for treating wastewater flowing through a conduit, said wastewater treatment system comprising a tablet loading neck constructed so as to extend from the conduit; a tablet loading sleeve provided in said tablet loading neck; a plurality of chemical treatment tablets having openings therein disposed in said tablet loading sleeve in stacked relationship; and a tablet support rod extending through said openings in said chemical treatment tablets and through said tablet loading neck and constructed to extend into the conduit for suspending said chemical treatment tablets in the wastewater flowing through the conduit.

2. A wastewater treatment system for treating effluent flowing through a sewer pipe, said wastewater treatment system comprising a wastewater flow conduit inserted in the sewer pipe for receiving the effluent; a tablet loading neck extending from said wastewater flow conduit; lid means provided on said tablet loading neck for removably closing said tablet loading neck; a tablet support rod slidably extending through said lid means and said tablet loading neck and terminating in said wastewater flow conduit; bias means provided on said lid means, said bias means engaging said tablet support rod for biasing said tablet support rod upwardly; a first set of chemical treatment tablets slidably mounted on said tablet support rod in stacked relationship in said wastewater flow conduit and a second set of chemical treatment tablets sidably mounted on said tablet support rod in stacked relationship in said tablet loading neck, whereby said second set of chemical treatment tablets descends by gravity on said tablet support rod to replace said first set of chemical treatment tablets, as said first set of chemical treatment tablets is dissolved in the effluent.

3. The wastewater treatment system of claim 2 comprising a tablet loading sleeve provided in said tablet loading neck for receiving said tablet support rod and said chemical treatment tablets.

4. The wastewater treatment system of claim 2 comprising alarm switch means connected to said tablet support rod, wherein said alarm switch means is activated responsive to upward movement of said tablet support rod with respect to said lid means.

5. The wastewater treatment system of claim 4 comprising a tablet loading sleeve provided in said tablet loading neck for receiving said tablet support rod and said chemical treatment tablets.

6. The wastewater treatment system of claim 2 comprising alarm switch means engaging said bias means, whereby said tablet support rod slides upwardly through said lid means responsive to said bias means and activates said alarm switch means as said chemical treatment tablets are dissolved in the effluent.

7. The wastewater treatment system of claim 6 comprising a tablet loading sleeve provided in said tablet loading neck for receiving said tablet support rod and said chemical treatment tablets.

8. The wastewater treatment system of claim 2 comprising a spring retainer nut threaded on said tablet support rod above said lid means and wherein said bias means comprises a coil spring interposed between said spring retainer nut and said lid means.

9. The wastewater treatment system of claim 8 comprising alarm switch means engaging said tablet support rod and wherein said alarm switch means is activated responsive to upward movement of said tablet support rod with respect to said lid means.

10. The wastewater treatment system of claim 8 comprising a tablet loading sleeve provided in said tablet loading neck for receiving said tablet support rod and said chemical treatment tablets.

11. The wastewater treatment system of claim 8 comprising alarm switch means engaging said tablet support rod, wherein said alarm switch means is activated responsive to upward movement of said tablet support rod and comprising a tablet loading sleeve provided in said tablet loading neck for receiving said tablet support rod and said chemical treatment tablets.

12. The wastewater treatment system of claim 2 wherein said bias means comprises a lid retainer nut threaded on said tablet support rod above said lid means and a deformable membrane spanning said lid means and engaging said lid retainer nut for biasing said tablet support rod upwardly.

13. The wastewater treatment system of claim 12 comprising alarm switch means engaging said tablet support rod and wherein said alarm switch means is activated responsive to upward movement of said tablet support rod and deformation of said deformable membrane upwardly.

14. The wastewater treatment system of claim 12 comprising a tablet loading sleeve provided in said tablet loading neck for receiving said tablet support rod and said chemical treatment tablets.

15. The wastewater treatment system of claim 12 comprising alarm switch means engaging said tablet support rod and wherein said alarm switch means is activated responsive to upward movement of said tablet support rod and deformation of said deformable membrane upwardly and comprising a tablet loading sleeve provided in said tablet loading neck for receiving said tablet support rod and said chemical treatment tablets.

16. A wastewater treatment system for treating effluent flowing through a wastewater pipe from a sewage treatment plant, said wastewater treatment system comprising a wastewater flow conduit inserted in the wastewater pipe for receiving the effluent; a tablet loading neck extending from said wastewater flow conduit in substantially perpendicular relationship with respect to the wastewater pipe; lid means provided on said tablet loading neck for removably closing said tablet loading neck; a tablet support tube extending through said lid means and said tablet loading neck and terminating in said wastewater flow conduit, a substantially transparent first window provided in said tablet support tube in said wastewater flow conduit and a photoelectric sensor provided in the upper end of said tablet support tube; a first set of chemical treatment tablets slidably mounted on said tablet support tube in stacked relationship in said tablet loading neck and covering said first transparent window and a second set of chemical treatment tablets slidably mounted on said tablet support tube in stacked relationship in said tablet loading neck, whereby said second set of chemical treatment tablets descends by gravity on said tablet support tube to replace said first set of chemical treatment tablets, as said first set of chemical treatment tablets is dissolved in the effluent, and said first transparent window is uncovered and said photoelectric sensor is activated, when said second set of chemical treatment tablets is dissolved in the effluent.

17. The wastewater treatment system of claim 16 comprising a tablet loading sleeve provided in said tablet loading neck for receiving said tablet support rod and said chemical treatment tablets.

18. The wastewater treatment system of claim 16 comprising a second transparent window provided in said tablet support tube in said tablet loading neck, whereby said second transparent window is uncovered and said photoelectric sensor is actuated as said second set of chemical treatment tablets descends on said tablet support tube to replace said first set of chemical treatment tablets.

19. The wastewater treatment system of claim 16 comprising a tablet loading sleeve provided in said tablet loading neck for receiving said tablet support rod and said chemical treatment tablets, and wherein said tablet loading column is inserted in said tablet loading neck and further comprising a second transparent window provided in said tablet support tube in said tablet loading neck, whereby said second transparent window is uncovered and said photoelectric sensor is actuated as said second set of chemical treatment tablets descends on said tablet support tube to replace said first set of chemical treatment tablets.

\* \* \* \* \*